Jan. 20, 1959 E. S. PETERSON 2,870,256

UNIVERSAL LOUDSPEAKING TELEPHONE SYSTEM

Filed Oct. 5, 1956 3 Sheets-Sheet 1

INVENTOR.
EDWARD S. PETERSON
BY [signature]
ATTY.

Jan. 20, 1959 E. S. PETERSON 2,870,256

UNIVERSAL LOUDSPEAKING TELEPHONE SYSTEM

Filed Oct. 5, 1956 3 Sheets-Sheet 2

INVENTOR.
EDWARD S. PETERSON
BY Wm. Walter Owen
ATTY.

Jan. 20, 1959 E. S. PETERSON 2,870,256

UNIVERSAL LOUDSPEAKING TELEPHONE SYSTEM

Filed Oct. 5, 1956 3 Sheets-Sheet 3

INVENTOR.
EDWARD S. PETERSON
BY Wm. Walter Owen.
ATTY.

United States Patent Office 2,870,256

Patented Jan. 20, 1959

2,870,256

UNIVERSAL LOUDSPEAKING TELEPHONE SYSTEM

Edward S. Peterson, Elmwood Park, Ill., assignor to General Telephone Laboratories, Incorporated, a corporation of Delaware Application October 5, 1956, Serial No. 614,221

7 Claims. (Cl. 179—1)

The invention relates to loudspeaking telephone systems. More particularly the invention relates to systems of this kind which are arranged both for "distant-talking" by means of a microphone and loudspeaker and for regular or "close-range" communication by means of a handset.

In the past, telephone stations for use in systems of this type were custom-built, as it were, i. e. they had to be especially designed for this kind of dual operation. Thus, a dual-service substation of this sort would mount, in addition to the conventional substation equipment, some part of the loudspeaking apparatus such as the microphone and a volume control, and would also mount the manual switches, for example, a pair of push buttons, for selectively transferring the subscribers line from one type of service to the other.

One reason for this special-design approach was that from a circuit standpoint the regular substation equipment must be integrated with the loudspeaking equipment proper to permit such a transfer. For example, if the dial mounted on the subset is to be used with either kind of operation, then this dial must be included in the loop circuit to the loudspeaking apparatus when loudspeaking service has been selected.

While selective loudspeaking systems of this custom type are fully satisfactory in operation, it frequently happens that a subscriber who already has a conventional subset, wishes to add loudspeaking facilities to his installation. In the past, the only way to meet this requirement was by removing the conventional subset and substituting therefor a complete loudspeaking installation, including a substation especially designed for this type of service.

Another drawback of the prior-art selective loudspeaking systems was that generally speaking they did not allow for special services of other kinds which require additional equipment, such as keys or lamps, on the subset for this purpose. Due to the absence of other convenient locations such special service keys, for example, pick-up keys in the case of a multi-line or intercom-substation are usually mounted in the same space, namely the front of the subset below or above the dial in which the above-mentioned switching and other control equipment is mounted on a telephone set designed for selective loudspeaking service. The design of special subsets of a size large enough to accommodate both these types of equipment can not well be justified from a production standpoint because of the high toll costs involved, and from the standpoint of the user such sets would be objectionable because of their bulkiness and because of the difficulty of carrying such a set from one place to another. In the past, therefore, a subscriber could obtain either selective loudspeaking service or he could obtain one of the other special services, such as intercom service, but he could not obtain both of these types of services in connection with a single substation.

It is accordingly one object of the present invention, to provide a selective loudspeaking arrangement of virtually universal applicability, that is an arrangement whereby this kind of service may be given in conjunction with almost any conventional central-battery type of substation, either initially or by way of later addition.

Another object of the invention is to provide an arrangement whereby selective loudspeaking service may be given in conjunction with most types of special-service substations, for example, multi-line substations, either initially or by way of conversion.

It is yet another object of the invention to provide an arrangement of either of these two kinds which facilitates the use of the substation dial under both selective conditions, i. e., when the system is set up for handset operation and also when the system has been set up by the user for distant-talking operation.

In accordance with one feature of the invention the manual control apparatus, such as the "On" and "Off" buttons for switching the system from handset to distant-talking operation and vice versa, and preferably also such further control equipment as a volume control potentiometer and an "On" indicating lamp are mounted in a small microphone cabinet separate from the subset. This combination microphone and control unit, may be accommodated, in addition to the loudspeaker cabinet and to the subset itself, on the user's desk while a further cabinet housing the remaining equipment needed for loudspeaker operation, such as the microphone amplifier and the speaker amplifier together with their power supply, the hybrid system and a transfer relay may be mounted out of sight, for instance, underneath the desk. This last-mentioned cabinet is interconnected with the subset and with the other two cabinets by means of small cables.

More particularly the circuit arrangement is such that the transfer relay in operating upon depression of the "On" button, in addition to its other switching functions places the line connected to the subset, or, in the case of an intercom telephone, the line selected by actuation of a pick-up key in circuit with the hybrid system in series with the subset dial; in addition, the relay may simultaneously act to place a short-circuit across the transmission equipment in the substation. In this manner, too, selective loudspeaking service may be added to an existing conventional or multi-line substation by simply "patching" a few connections on to the terminals of this substation, that is, this conversion may be effected without interference with the existing wiring of such a substation.

The invention, both as to its organization and method of operation, together with other objects and features thereof, will best be understood by reference to the following specification taken in connection with the accompanying drawings. In these drawings.

Before the operation of the loudspeaking telephone system shown in Figs. 1–4 is described in detail, a brief explanation will first be given of the apparatus used in this system.

Figure 1:
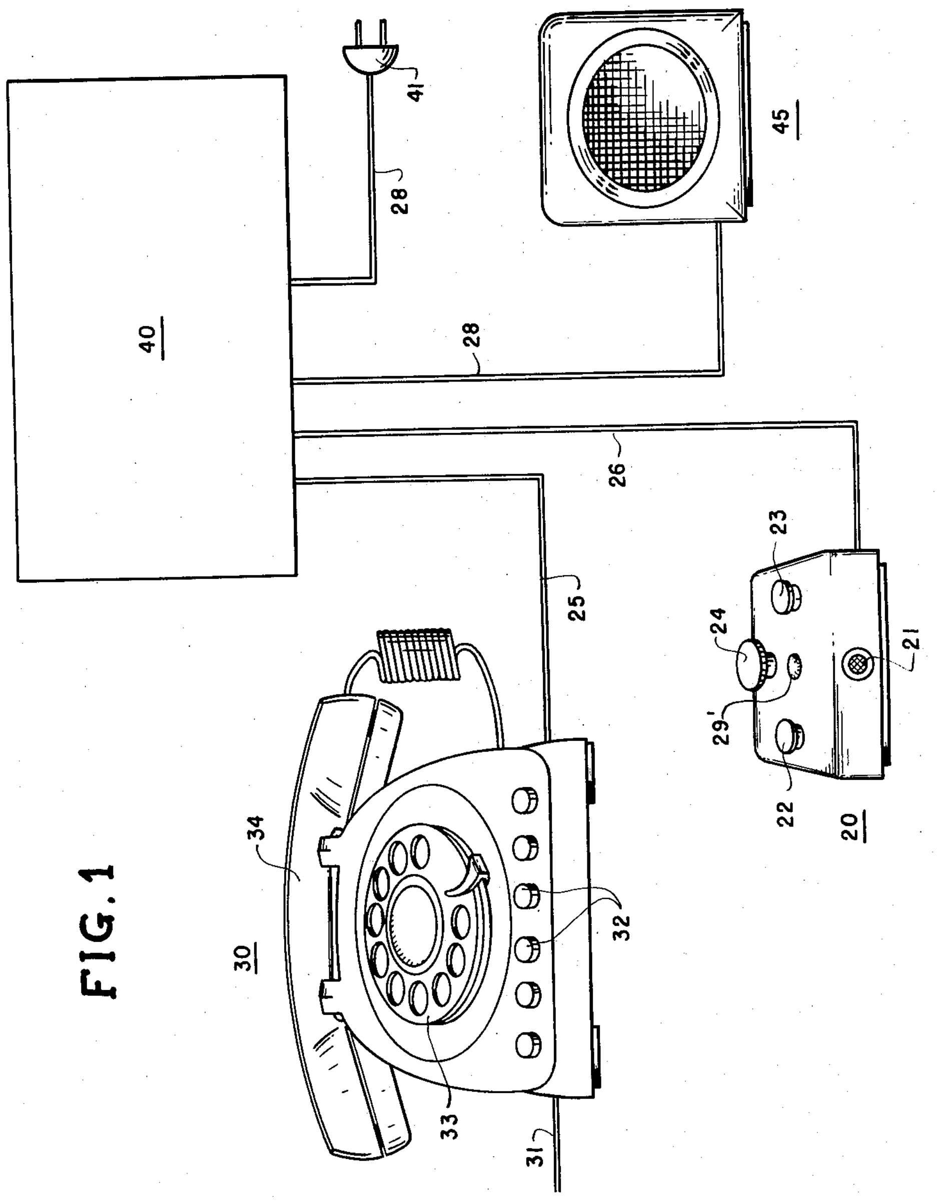
Fig. 1 is the schematic diagram of a selective loudspeaking system in which the manual transfer switches are mounted, together with the microphone, in a separate control unit.

Referring to Fig. 1 there is shown a typical key type or inter-communicating telephone substation 30 having a handset 34 and a dial 33. Below dial 33 there is provided a row of push keys 32 by means of which the subscribed at this substation may select any of the lines connected to this station by way of cable 31. These lines may be of any type, for instance, they may be inter-com lines, subscriber lines connected to a private automatic exchange, trunks to a main exchange, private lines, etc. In addition the row of keys 32 may include keys for special services, for example, a hold key, an exclusion key or the like.

Substation 30 is further connected by way of a small cable 25 with a miscellaneous-equipment unit 40 which preferably is mounted out of sight, for example, underneath the user's desk. Also connected with unit 40, namely via cable 26, is a small control unit 20 which may be placed next to subset 30 on top of the subscriber's desk. This control unit mounts in its front portion a microphone 21 and in its top portion an "On" button 22, an "Off" button 23 and a volume control 24. Behind aperture 29' in the top panel of cotnrol unit 20 there is mounted a pilot lamp, designated 29 in Fig. 2, for indicating the "On" condition of the system, that is, the condition in which the system is set up for loudspeaking operation. There is finally provided a loudspeaker 45 which is connected to miscellaneous-equipment unit 40 through a cable 27. Preferably control unit 20 and speaker 45 are placed on the desk in such a position relative to each other that the axis of the microphone is at a substantially right angle to that of the loudspeaker. In this way acoustic feedback between microphone and loudspeaker are minimized. Cable 28 which is terminated by plug 41 serves to connect miscellaneous-equipment unit 40 to a source of commercial alternating current.

Figures 2, 3:
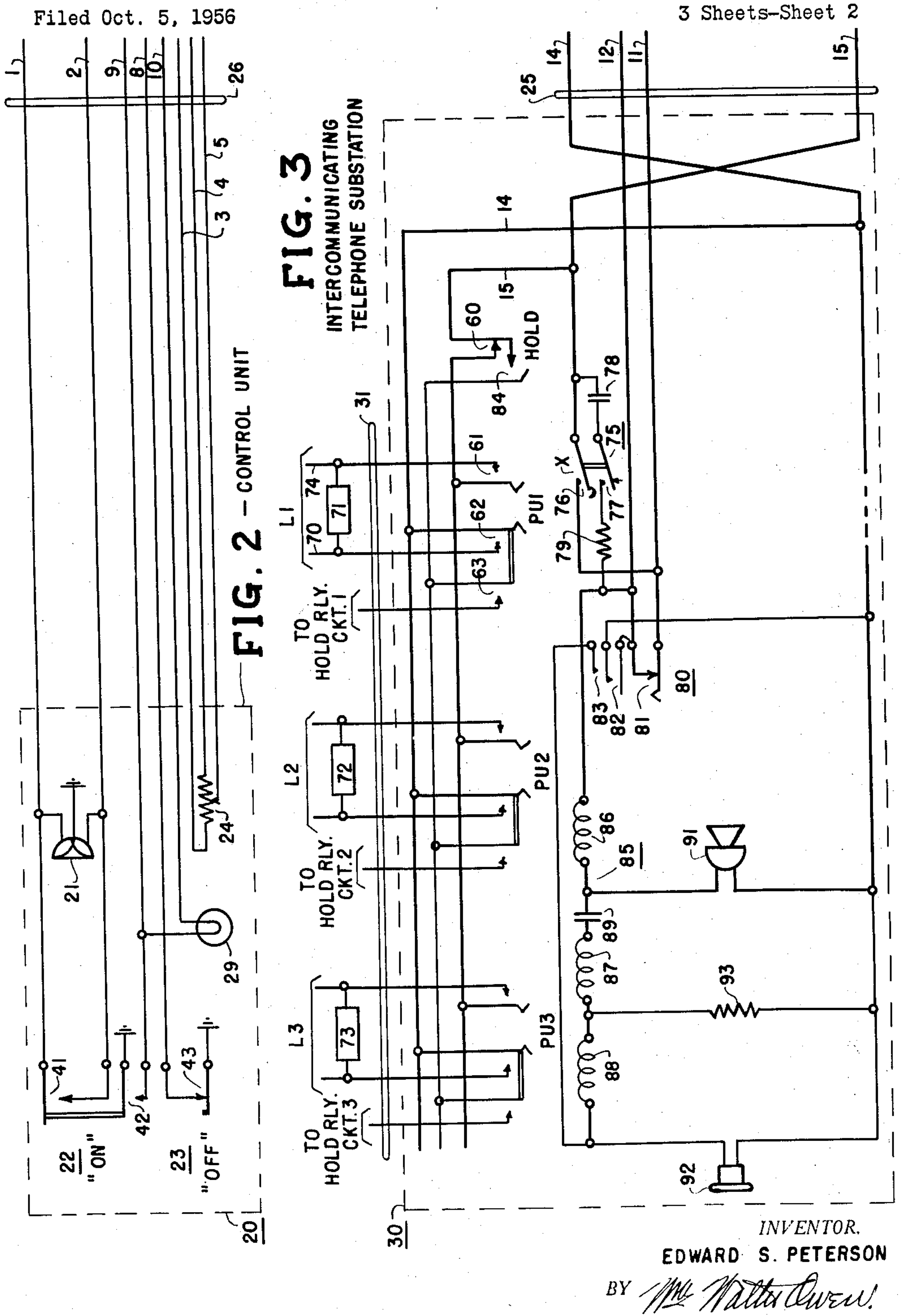
Fig. 2 shows the circuit of this control unit itself.
Fig. 3 shows the circuit of a typical key-type intercommunicating telephone substation in conjunction with which the control unit according to Fig. 2 may be used.

In Fig. 2 which shows the circuit of control unit 20 reference character 21 again designates the microphone, 22 the "On" button, 23 the "Off" button and 24 the volume control potentiometer while 29 is the indicating lamp.

Fig. 3 illustrates the circuit of the intercommunicating or multi-line telephone substation 30 of Fig. 1. This substation circuit includes the usual switchhook 75, dial 80, anti-sidetone induction coil 85, balancing resistance 93, transmitter 91 and receiver 92, this transmitter and receiver being mounted at the two ends, respectively, of handset 34, Fig. 1. As far as the foregoing components are concerned the substation circuit is the same as that disclosed in patent application Serial No. 592,401 filed by Harold C. Pye on June 19, 1956. Line equalizing means have been omitted in Fig. 3 as they have no bearing on the present invention.

While the instant in vention may be practiced with an individual-line substation of this type, three lines have been shown connected to the substation, Fig. 3, in the usual manner. Bridged across each of these lines L1, L2, and L3 there is shown a corresponding ringing signal receiving circuit 71, 72 and 73. Since such circuits are well-known in the art and since their details are without relevance to the present invention these details have not been illustrated in Fig. 3. Associated with each line there is a pick-up key PU1, PU2, and PU3 respectively. It is assumed that these pick-up keys are mechanically interlocked with each other so that as each pick-up key is depressed the previously actuated pick-up key is automatically released, and it is further assumed that there is no mechanical interlock between these pick-up keys and the switchhook. A non-locking hold key, Fig. 3, may be provided if it is desired to hold a line or trunk while a connection is being set up over another line. All three lines have been shown arranged for this holding service in Fig. 3 but it will be understood that different types of special services could be provided on the various lines if desired.

Figure 4:
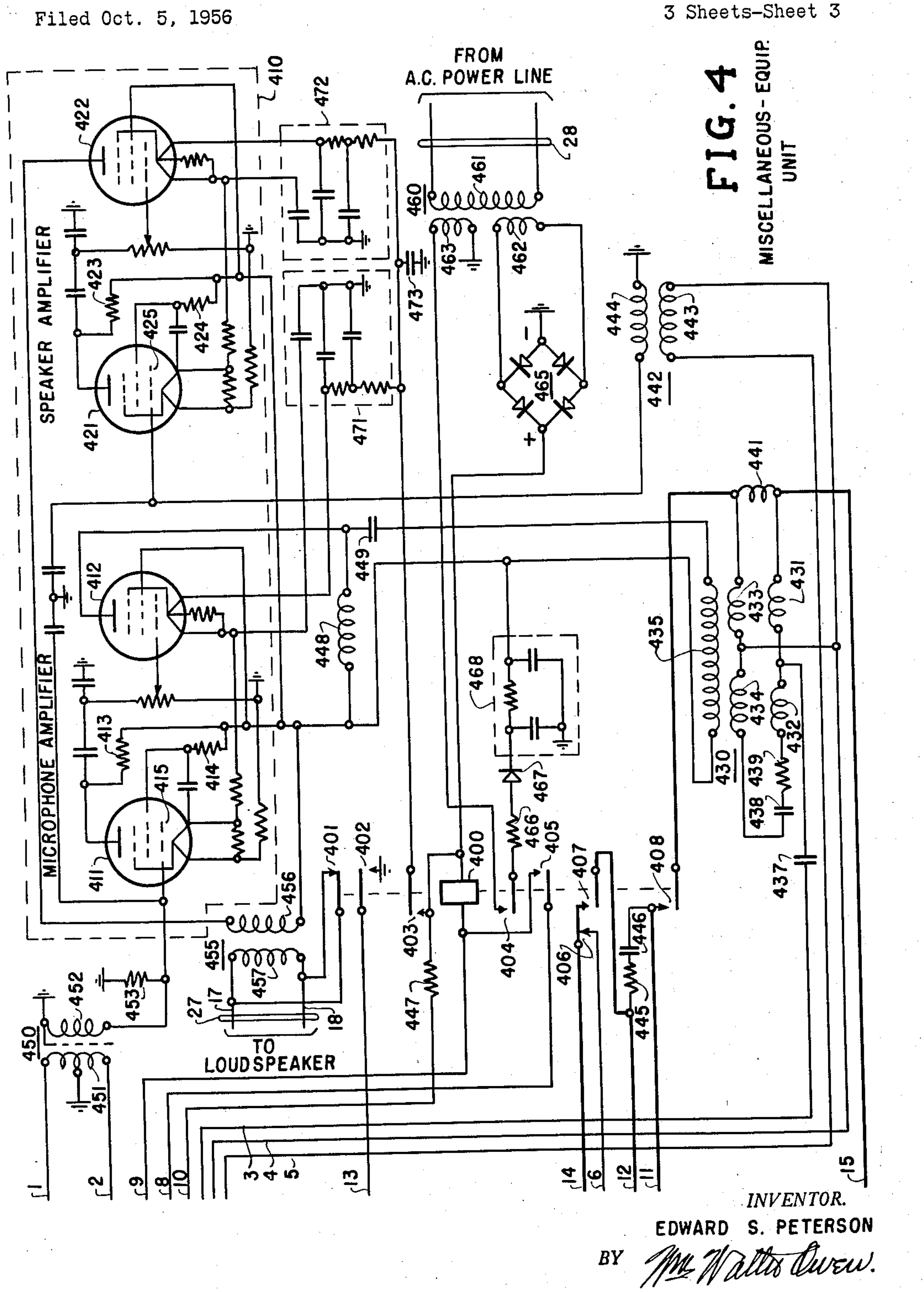
Fig. 4 shows the circuit of the miscellaneous-equipment unit.

The miscellaneous-equipment unit illustrated in Fig. 4 includes as its principal components a microphone amplifier and a speaker amplifier, both these amplifiers being mounted on a printed circuit card 410; a power supply for these amplifiers including power transformer 460, plate voltage rectifier 467 and associated filter 468; filament voltage supply rectifier 465 and two separate filters supplied from this rectifier, namely filter 471 for supplying the microphone amplifier with a filtered filament voltage and filter 472 for supplying the speaker amplifier with a filtered filament voltage; the hybrid system including hybrid transformer 430, balancing network 438, 439 and choke 441; input transformer 450 for the microphone amplifier and input transformer 442 and output transformer 455 for the speaker amplifier; and finally a switching relay 400.

Each of the two amplifiers consists of two pentodes of the miniature, directly heated type. Due to the negligible warm-up time required by these tubes it is not necessary to leave the filament of these amplifiers under current all the time; that is, as explained in greater detail hereinafter, it becomes possible to turn the filament power for these amplifiers on only while they are actually used. The employment of such directly-heated tubes in this loudspeaking system is facilitated by the use of separate filters, namely the above-mentioned filters, 471 and 472, for the filament circuits of the microphone amplifier and speaker amplifier, respectively. Due to the use of these separate filters regenerative effects which might otherwise give rise to howling are avoided. In connection with this feature reference is made to United States Patent 2,369,460 to R. H. Herrick.

The operation of the system, Figures 1–4, by means of the handset will first be described. To this end let it be assumed that the subscriber at the telephone station shown in Fig. 3 wishes to make an outgoing call over line L1. The subscriber accordingly lifts his handset, thereby operating cradle switch 75, and then depresses the pick-up key, PU1, associated with line L1. The following loop circuit is now closed over line L1: battery through one winding of the line relay, not shown, in the central office, conductor 70 of line L1, contact 62, conductor 14, transmitter 91, line winding 86 of induction coil 85, impulse springs 81 of dial 80, contact 76 of cradle switch 75, conductor 15, contacts 60 and 61, conductor 74 of line L1, other winding of the line relay, not shown, and ground in the central office. Operation of the line relay causes the first numerical switch, for instance, the selector, not shown, in the central office to be connected to line L1 in the well-known manner so that the subscriber at substation 30 receives dial tone.

The subscriber now dials the number of the desired party by repeatedly actuating his dial, whereby the loop circuit traced above is opened at impulse springs 81 once for each impulse. At dial shunt springs 82, 83 short-circuits are placed during each actuation of the dial across receiver 92 and across transmitter 91 and induction coil winding 86. Resistance 79 and condenser 78, together with contacts 76, 77 of the hookswitch form a spark suppression circuit for the impulse springs.

After all digits have been sent the called subscriber's bell is rung in the usual manner and the last-mentioned subscriber answers the call by lifting the receiver at his substation, not shown. This causes the connector, not shown, in the central office to switch the connection through in a manner well-understood in the art so that the conversation between the two subscribers may begin.

It will be appreciated that transmitter 91 receives battery feed from the central office battery over the loop circuit traced above except that, at this time, battery and ground are fed through the line relay of the connector rather than that of the line circuit is involved. Voice currents generated by transmitter 91 follow two parallel paths one of which extends over line L1 while the other is a local path which may be traced as follows: upper terminal of transmitter 91, Fig. 3, contacts 89, induction coil winding 87, balancing resistance 93 and, in multiple thereto, induction coil winding 88 and receiver 92, and back to the lower terminal of transmitter 91. Winding 88 is connected and designed to act as an anti-sidetone winding; as a result the voltage induced in winding 88 balances the voltage drop across resistance 93 for average line conditions so that no voice current traverses receiver 92. However, this receiver responds to voice currents incoming over line L1, namely due to signal voltages induced in induction coil winding 87 which give rise to the flow of signal current in the following circuit: left terminal of winding 87, Fig. 3, winding 88, receiver 92, transmitter 91, condenser 89, right hand terminal of winding 87.

The hold key is provided to enable the subscriber at substation 30 to hold a line, for instance, a trunk to a main office, while setting up a connection over another line, for instance, line L2. Regarding the details of this holding feature which are of no pertinence to the present invention, reference is made to D. H. King Patent 2,273,-530. Suffice it to say that upon operation of the holding button one side of the line is opened at contact 60 while at contact 84 conductor 15 is extended by way of contact 63 to the hold relay circuit, not shown, which is associated with the line, in the instant case L1, to be placed on holding.

Upon release of the hold key the previously depressed pick-up key, PU1, is automatically restored to normal. When the subscriber at the end of his call over line L2, reactuates key PU1 to resume the original conversation over line L1, the hold relay circuit associated with this line returns to its normal condition. At the end of the conversation over line L1 the subscriber at substation 30 replaces the receiver, thereby opening the loop circuit at contact 76 and releasing the switching equipment, not shown, in the central office.

If a call for substation 30 is incoming over one of the lines, for example, L1 then the corresponding ringing signal receiving circuit, in this case 71, responds to the ringing current projected over the subscriber's line by actuating an audible signal, not shown, at or near the substation in the conventional manner; if this audible signal is common to all lines it is usually supplemented by a visual signal identifying the line over which the call has come in. For this purpose, and also for providing a busy indication for each line, each of the pick-up keys may have associated therewith a combination calling-and-busy lamp, these lamps not being shown in Figs. 1 and 3.

The subscriber at substation 30 answers the call by removing his handset and actuating pick-up key PU1. This completes the loop circuit to the central office and causes the transmission of ringing current to be discontinued and the connection to be switched through in the well-known manner. Transmission of voice frequencies from and to this substation subsequently takes place in the manner described above. At the end of the call the subscriber again replaces his handset.

It will now be assumed that the subscriber at substation 30 wishes to set up a loudspeaking connection with another party. The subscriber accordingly depresses "On" button 22, Fig. 2, momentarily without removing the handset and then actuates pick-up key PU1. In response to the actuation of the "On" button switching relay 400, Fig. 4, operates in the following circuit: ground, contact 42 of the "On" button, conductor 9, winding of relay 400, positive terminal of filament supply rectifier 465, negative terminal of this rectifier, ground. As will be seen from an inspection of Fig. 4 rectifier 465 is of the bridge type and is supplied with alternating current through the secondary winding 462 of power transformer 460 the primary winding 461 of which is connected to the A. C. power line. It will also be noted from Figs. 2 and 4 that "On" indicating lamp 29 is connected by way of conductors 9 and 10 and resistance 447 across the winding of relay 400 so that this lamp is lit upon closure of contact 42.

Since "On" button 22 returns to normal as soon as the subscriber releases it the short-circuit momentarily placed across microphone 21 by contacts 41 is without effect. On the other hand, relay 400 upon operation locks in the following circuit: ground, contact 43 of "Off" button 23, conductor 8, contact 405, winding of relay 400, rectifier 465, ground. Due to the ground connection extended via contacts 43 and 405 "On" lamp 29 remains lit after release of "On" button 22.

With relay 400 operated and pick-up key PU1 in actuated condition the following loop circuit is closed: battery and first winding of the line relay, not shown, in the central office, conductor 70 of line L1, contact 62, conductor 14, contact 407 of relay 400, conductor 12, dial impulse springs 81, Fig. 3, conductor 11, contact 408 of relay 400, choke 441, conductor 15, contacts 60 and 61, conductor 74 of line L1, second winding of the line relay, not shown, and ground in the central office.

Upon hearing dial tone the subscriber may now dial the called party's number by correspondingly actuating the dial, 80, in his substation 30. This is made possible by the fact that impulse springs 81 of this dial are included by way of conductors 11, 12 in the loop circuit just traced. It will also be noted that contact 407 acts to place a short-circuit on the transmission equipment of substation 30 which short-circuit may be traced from the right-hand terminal of induction coil winding 86, Fig. 3, by way of conductor 12, contact 407, conductor 14 to the common terminal of transmitter 91 and receiver 92; by means of this short-circuit the transmission equipment of the substation is thus kept from introducing a loss in the loop circuit with the system conditioned for distant-talking operation.

Spark suppression for dial impulse springs 81 in the instant case is provided by resistance 445 and condenser 446, Fig. 4 namely by way of conductors 12 and 11. The closure of dial shunt springs 82, 83 during each actuation of the dial is without effect with the system set up for distant talking. Choke 441 is of low resistance and of relatively low impedance so that this choke may remain included in the loop circuit without harmful effect on the dialling operation.

When relay 400 operated as above described it extended the filament voltage supply from rectifier 465 to filters 471, 472 and common filter condenser 473 at contact 403; and at contact 404 of relay 400 the plate voltage supply was extended to filter 468, namely by way of ground, winding 463 of power transformer 460, contact 404, resistor 466, plate voltage supply rectifier 467, filter 468. As will be observed from Fig. 4, filter 468 supplies plate voltage to tubes 411 and 421 through resistors 413 and 423, respectively; supplies tube 412 with plate voltage through choke 448; and supplies tube 422 with plate voltage through secondary winding 456 of transformer 455. Filter 468 furthermore supplies the screen grids of tubes 411 and 421 with the necessary voltage through resistors 414 and 424, respectively, and supplies the screen grids of tubes 412 and 422 with the required voltage directly.

When relay 400 operated, it also opened at contact 401 a short-circuit normally existing across loudspeaker conductors 17, 18 and at contact 402 furnished ground to conductor 13. This last-mentioned conductor is not used in the instant case but may be employed in connection with substations of a type requiring a ground connection, for example to a special service key, which is to be closed only while the system is in use.

After the connection to the distant party has been completed and switched through in the central office the subscriber at substation 30 may begin conversing with the other party, namely through his microphone 21, Figs. 1 and 2, and loudspeaker 45, Fig. 1. Signal voltages produced by microphone 21 are impressed on primary winding 451 of transformer 450 by way of conductors 1, 2 and the corresponding signal voltages induced in secondary winding 452 of this transformer are impressed on control grid 415 of input tube 411 of the microphone amplifier. The ground connections to the housing of microphone 21 and to the midpoint of winding 451 are provided for balancing purposes only. After amplification in both stages 411, 412 of this amplifier the microphone signal is reproduced in winding 435 of hybrid coil 430, this last-mentioned winding, in series with condenser 449, being connected across choke coil 448 which as mentioned above is included in the plate voltage supply circuit of tube 412. From winding 435 the signal is then induced in windings 431 to 434 of hybrid coil 430 all of these windings, together with balancing network 438, 439, being serially connected across choke coil 441 which is included in the loop circuit. In this manner the amplified signal from microphone 21 is transmitted over line L1.

Assuming that network 438, 439 substantially balances the impedance of line L1, the signal voltage between the junction point of windings 431, 432 and the junction point of windings 433, 434 is zero or negligible so that the amplified microphone signal does not reach volume control potentiometer 24, Fig. 2, by way of conductors 3, 4. Hence, this signal does not reach the primary winding 443 of transformer 442 which winding is connected across conductors 4 and 5, that is, across the right-hand terminal and the slider of potentiometer 24. Since, therefore, the signal originating in the microphone is substantially kept from reaching the input of the speaker amplifier, howling due to any acoustic feedback that may exist between loudspeaker and microphone is prevented.

Signal currents incoming over line L1, on the other hand, are impressed on volume control potentiometer 24, namely over the branch circuit extending from the upper terminal of choke 441 through winding 433, conductor 4, winding of potentiometer 24, conductor 3, condenser 437, winding 431, lower branch of choke 441. A greater or lesser amount of this signal depending on the slider setting of potentiometer 24 is thus impressed on primary winding 443 of transformer 442 and from secondary winding 444 of this transformer on control grid 425 of input tube 421 of the speaker amplifier. Since, as mentioned above, primary winding 456 of transformer 455 is included in the plate circuit of output tube 422 of this amplifier, the amplified signal finally is impressed from the secondary winding 457 of this transformer and cable 27 on loudspeaker 45, Fig. 1.

Let it now be assumed that the subscriber at substation 30, with the system conditioned for distant talking as just described, is engaged in a conference in his office and that he does not wish the party at the distant end of the connection to hear what is said around the conference table. In order temporarily to exclude the party at the other end from the local conversation the subscriber again depresses "On" button 22, Fig. 2, whereby contact 41 of this button places a short-circuit across microphone 21. Therefore, as long as the "On" button is held depressed no signal can be picked up by microphone 21 and transmitted over line L1. The transmission of voice currents incoming from the distant substation over line L1, however, is not interfered with so that these voice currents are reproduced in loudspeaker 45, Fig. 1, as before. When the subscriber at substation 30 releases button 22 of the control unit the short-circuit across microphone 21 is removed and speech is again transmitted over line L1 in both directions.

It will now be assumed that the subscriber at telephone station 30, in order to exclude the other persons in his office from his conversation with the distant party, wishes to transfer the system from distant-talking operation to handset operation. The subscriber accordingly lifts his handset 34, Fig. 1, from the cradle and then depresses nonlocking "Off" button 23, Fig. 2, momentarily. When ground is thus disconnected from conductor 8 at contact 43 the above-traced locking circuit of switching relay 400 is broken so that this relay is permitted to release and "On" lamp 25 which is connected across the winding of relay 400 is simultaneously extinguished.

Relay 400 in releasing restores miscellaneous-equipment unit Fig. 4 to its normal circuit condition. More particularly, the two voltage supply circuits to the amplifier assembly are opened at contacts 403 and 404 respectively; another point in the locking circuit of relay 400 is opened at contact 405; at contact 401 loudspeaker conductors 17, 18 are short-circuited to prevent clicks from being heard in the loudspeaker during the cooling-off period of the amplifier tubes; the short-circuit across the transmission equipment in substation 30 is removed at contact 401; and the branch of the loop circuit including choke coil 441 interrupted at contact 408. However, inasmuch as the handset was removed prior to the depression of "Off" button 23 an alternative branch of the loop circuit has already been completed at switchhook contact 76. This new loop may be traced from conductor 70 via contact 62, conductor 14, transmitter 91, winding 86 of induction coil 85, contacts 81 and 76, conductor 15, contacts 60 and 61 to conductor 74. Since, therefore, no interruption of the loop circuit extending over line L1 takes place the switching equipment in the central office is held during and after the transfer operation. Transmission of voice currents now takes place in the same manner as explained above in connection with handset operation of the present system.

If the subscriber at substation 30 wants to switch the system back to distant talking he may again depress "On" button 22 momentarily and thereafter replace the handset. Relay 400, therefore, again operates and locks so that the circuit now is in the same condition as explained above for distant-talking operation. Attention is invited to the fact that because of the absence of a mechanical inter-lock between the pick-up keys and the hookswitch, pick-up key PU1 is still in actuated condition after the handset has been replaced incident to the last-mentioned transfer to loudspeaking operation.

At the end of the conversation the subscriber at telephone station 30 momentarily depresses "Off" button 23 whereby switching relay 400 is again permitted to release as described above. Since no alternative branch circuit is available at this time the loop circuit extending over line L1 is opened upon the opening of contact 408 of relay 400. With the subscriber's loop opened the switching equipment in the central office is also returned to normal.

From the foregoing description it will be understood that an incoming call received over any of the lines, for example line L1, may be answered by merely actuating the corresponding pick-up key, if it is not already in actuated condition, and further depressing "On" button 22, whereupon conversation may be carried on by means of microphone 21 and loudspeaker 45. It will also be appreciated that a call originated or answered in the conventional manner, that is, by means of the handset, may later be switched to "distant-talking" by operation of "On" button 22, Fig. 2 and subsequent replacing of the handset.

The circuit arrangement of control unit 20 and miscellaneous-equipment unit 40 is such that these two units may be used in conjunction with virtually any single-line central-battery substation of modern design and may also be used with practically any modern multi-line central-battery substation, provided that there is no interlock between hookswitch and pick-up keys. This means that by the mere addition of control unit 20, miscellaneous-equipment unit 40 and loudspeaker 45, selective loudspeaking service may be added as a later attachment, to any of the foregoing substations.

While only a certain embodiment of the invention has been illustrated and described it is to be understood that numerous modifications in the details of arrangement may be resorted to without departing from the true spirit and scope of the invention as defined in the appended claims.

What is claimed is:

1. A loudspeaking telephone system comprising a subscriber line and a subset carrying a handset including a transmitter and receiver and including transmission equipment only as required for telephone communication by means of said handset, said system also comprising a microphone and an amplifier therefor, a speaker and an amplifier therefor, control means, including a manual switch, for selectively causing either said handset or said microphone, speaker and amplifier to be effectively connected to said line, and a cabinet separate from said subset for adapting the subset for use in a loudspeaking telephone system, said cabinet housing both said microphone and said manual switch.

2. A loudspeaking telephone system as defined in claim 1, wherein said cabinet mounts volume control means in addition to said manual switch and said microphone.

3. A loudspeaking telephone system comprising a subscriber line and a subset carrying a handset including a transmitter and a receiver, said subset mounting a dial and also mounting transmission equipment only as required for telephone communication by means of said handset, said system also comprising a microphone and an amplifier therefor, a speaker and an amplifier therefor and hybrid means interconnecting said two amplifiers, control means, including a manual switch, for selectively causing either said induction coil or said hybrid means to be effectively connected to said line in series with said dial and a cabinet separate from said subset for adapting the subset for use in a loudspeaking telephone system, said cabinet housing both said microphone and said manual switch.

4. A loudspeaking telephone system comprising a subscriber line and a subset carrying a handset including a transmitter and a receiver, said subset mounting a dial and also mounting transmission equipment only as required for telephone communication by means of said handset, said transmission equipment including an induction coil connected to both said transmitter and said receiver, said system also comprising a microphone and an amplifier therefor, a speaker and an amplifier therefor and hybrid means interconnecting said two amplifiers, means, including a manual switch and relay means controlled thereby, for effectively connecting either said induction coil or said hybrid means to said line in series with said dial, a first cabinet separate from but connected with said subset and housing said two amplifiers, said hybrid means and said relay means, a second separate cabinet connected with said first cabinet and housing said speaker, and a third separate cabinet for adapting the subset for use in a loudspeaking telephone system, said third cabinet being connected with said first cabinet and housing said microphone and said manual switch.

5. A loudspeaking telephone system as defined in claim 4, wherein said third cabinet houses, in addition to said microphone and manual switch, a signal device controlled by said relay means.

6. A loudspeaking telephone system comprising a subscriber line and a subset carrying a handset including a transmitter and a receiver, said subset mounting a dial and a hookswitch and also mounting transmission equipment only as required for telephone communication by means of said handset, said transmission equipment including an induction coil connected to both said transmitter and receiver connection of said induction coil to said line in series with said dial, said system also comprising a microphone and an amplifier therefor, a speaker and an amplifier therefor and hybrid means interconnecting said two amplifiers, control means including first and second manual switches, said first manual switch upon actuation causing said hybrid means to be connected to said line in series with said dial and said second manual switch upon actuation causing said hybrid means to be disconnected from said line, and a cabinet separate from said subset for adapting the subset for use in a loudspeaking telephone system, said cabinet housing both said microphone and manual switch.

7. A loudspeaking telephone system comprising a plurality of lines and a subset mounting a plurality of keys for selecting one of said lines and carrying a handset including a transmitter and receiver and including transmission equipment only as required for telephone communication by means of said handset, said system also comprising a microphone and an amplifier therefor, a speaker and an amplifier therefor, control means, including a manual switch, for causing either said handset or said microphone, speaker and amplifiers to be effectively connected to the line selected by said keys, and a cabinet separate from said subset for adapting the subset for use in said loudspeaking telephone system, said cabinet mounting both said manual switch and said microphone.

References Cited in the file of this patent

UNITED STATES PATENTS

| | | |
|---|---|---|
| 2,786,099 | Beatty | Mar. 19, 1957 |
| 2,801,287 | Clemency | July 30, 1957 |